United States Patent
Wargel

(10) Patent No.: US 7,048,168 B2
(45) Date of Patent: May 23, 2006

(54) CLIP PLACEMENT TOOL

(76) Inventor: Robert J. Wargel, 5844 Vann Rd., Newburgh, Warrick County, IN (US) 47630

(*) Notice: Subject to any disclaimer, the term of this patent is extended or adjusted under 35 U.S.C. 154(b) by 0 days.

(21) Appl. No.: 10/944,026

(22) Filed: Sep. 17, 2004

(65) Prior Publication Data
US 2005/0066501 A1 Mar. 31, 2005

Related U.S. Application Data

(60) Provisional application No. 60/506,257, filed on Sep. 29, 2003.

(51) Int. Cl.
*B21J 15/28* (2006.01)
(52) U.S. Cl. .................... 227/119; 227/112; 227/107
(58) Field of Classification Search ............... 227/113, 227/107, 112, 147, 119, 15, 18
See application file for complete search history.

(56) References Cited

U.S. PATENT DOCUMENTS

| | | | | |
|---|---|---|---|---|
| 3,906,615 A | * | 9/1975 | Campbell et al. | 29/432 |
| 4,131,009 A | * | 12/1978 | Hara et al. | 29/812.5 |
| 4,404,742 A | * | 9/1983 | Fuhrmeister | 29/798 |
| 4,828,159 A | * | 5/1989 | Woods | 227/156 |
| 4,909,418 A | * | 3/1990 | Cardinale et al. | 227/112 |
| 5,036,576 A | * | 8/1991 | Gast | 29/407.01 |
| 5,779,127 A | * | 7/1998 | Blacket et al. | 227/107 |
| 6,125,680 A | * | 10/2000 | Bradbury et al. | 72/391.6 |
| 6,502,008 B1 | * | 12/2002 | Maurer et al. | 700/175 |
| 6,592,015 B1 | * | 7/2003 | Gostylla et al. | 227/112 |

* cited by examiner

*Primary Examiner*—Scott A. Smith
(74) *Attorney, Agent, or Firm*—Gary K. Price, Esq.

(57) ABSTRACT

A clip placement tool for automatic or manual insertion of a plastic clip workpiece. The tool including a main body having a first feature to affix to an operator handle or affix to a mechanical device as an end-effecter, and a second feature that connects to a vacuum source, a chamber formed within the body, a lip formed at an end of the vacuum chamber and surrounding a static placement post within the chamber. The lip includes two edges that provide a lip-to-clip seal with the workpiece.

16 Claims, 6 Drawing Sheets

CLIP PLACEMENT TOOL

CROSS REFERENCES TO RELATED APPLICATIONS

U.S. Provisional Application for Patent No. 60/506,257, filed Sep. 29, 2003, with title "Clip Placement Tool" which is hereby incorporated by reference. Applicant claims priority pursuant to 35 U.S.C. Par. 119(e)(i).

Statement as to rights to inventions made under Federally sponsored research and development: Not Applicable

BACKGROUND OF THE INVENTION

1. Field of the Invention

The present invention relates generally to vacuum tools, and more particularly to a clip placement tool used to reliably nest and fixture plastic clips for automatic or manual insertion as used in manufacturing.

2. Brief Description of Prior Art

Plastic clips, specifically plastic Christmas tree style clips or clips with ribbed shanks having a flat or round or binder style or crowned style head are commonly used in a wide range of materials, examples are but not limited to wood, particle board, cardboard, rigid foam panels, plastic panels and metal panels. Typically, the clips are manually pushed into cored or pre-drilled holes in a device to affix the device to an object or affix an object to the device. The ribs of the clips are larger than the diameter of the hole they are pushed in, but the shank diameter of the clip is smaller than the whole diameter. The interference and angle of the ribs hold the clips tight in the hole.

These clips are commonly used in manufacturing, specifically the manufacture of automobiles, boats and trucks but also in the occasional use but not limited to the appliance, toy, housing and commercial structures as well. The clips are manufactured in several body styles, head styles and shank styles including thickness and length. Thus the disclosed invention may be manufactured in a wide range of sizes, shapes and styles to accommodate the wide range of clips.

Manually placing the clips can be time consuming and physically tiring. The small clips can be difficult to hold properly and align and can require significant force to place in holes. Alternately, the clips are started in a hole by hand and then driven into installation with a crude driver such as a hammer. This two step operation can provide the operator some relief from pushing in the clips but the two steps are more time consuming and off center hits with the crude driving device can crush the clips sideways requiring the operator to get a device such as a claw hammer to extract the crushed, partially driven clip from the hole.

As will be seen from the subsequent description, the preferred embodiments of the present invention overcome the above problems and difficulties of the prior art.

SUMMARY OF THE INVENTION

The present invention is directed to a clip placement tool used to reliably nest and fixture plastic clips for automatic or manual insertion. The uniqueness of this invention is that it is comprised of a one-piece construction, exerts force during insertion on the center of the clip and allows for non-center placement of clips to the invention while securely fixturing or nesting the clip for placement into an object. The invention is not limited to a single piece construction, since there may be instances that a multi-piece construction would be more easily manufactured and provide the best fit to the clip.

BRIEF DESCRIPTION OF THE DRAWINGS

FIG. 1 also illustrates a typical clip workpiece that may be used in association with the clip placement tool.

DESCRIPTION OF THE PREFERRED EMBODIMENT

In accordance with the present invention, a clip placement tool is disclosed. The clip placement tool is directed to nest and fixture plastic clips for automatic or manual insertion as used in manufacturing. The clip placement tool is preferably of one-piece construction, and exerts force on the center of the clip and allows for non-central placement of clips while securely fixturing or nesting the clip for placement into an object. The present invention as described may be manufactured as a one-piece construction or may be manufactured as a multi-piece construction. In the broadest context, the clip placement tool of the present invention consists of components configured and correlated with respect to each other so as to attain the desired objective.

Figure 1:
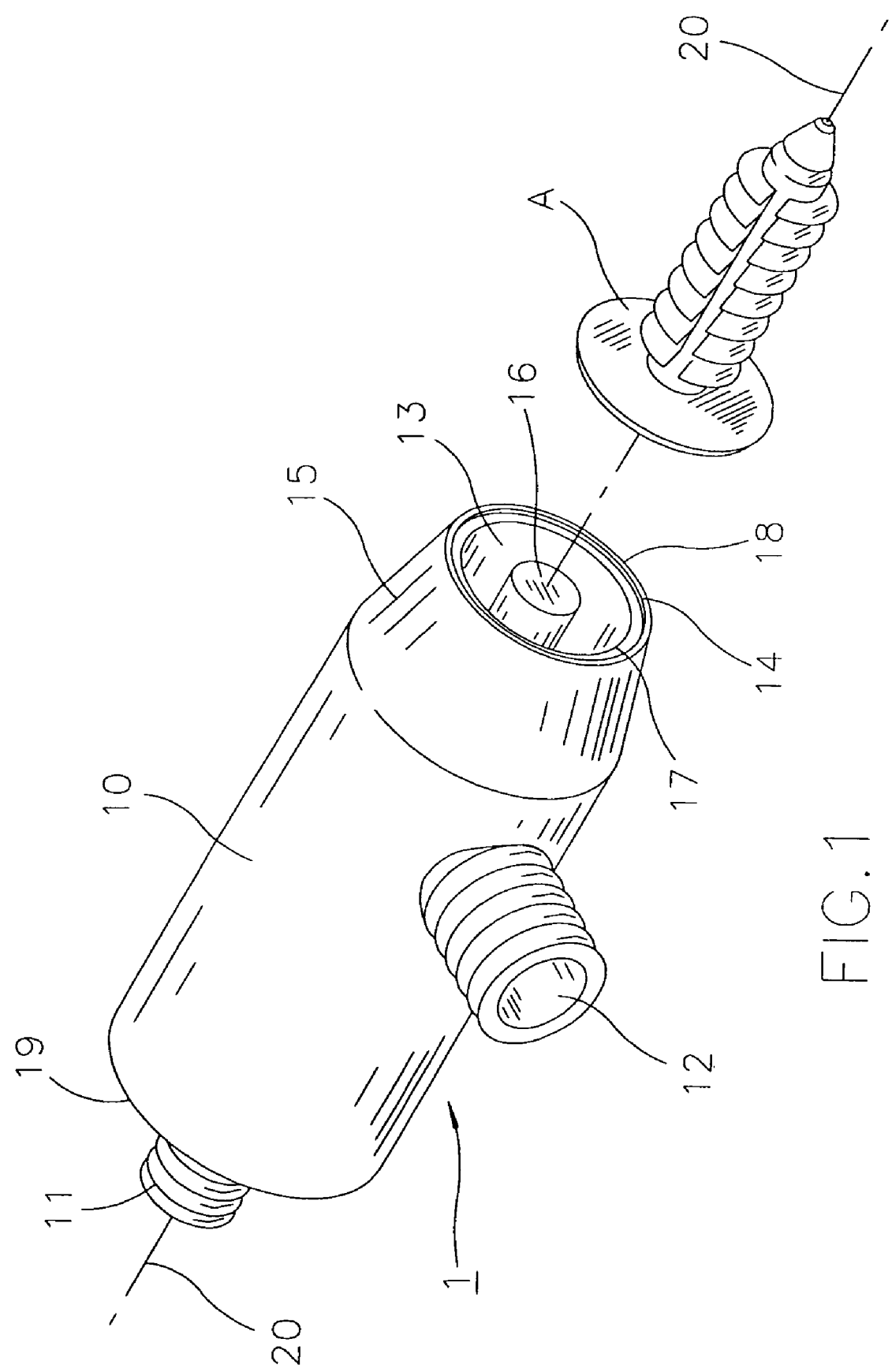
FIG. 1 is a perspective view of a preferred embodiment of the present invention, a clip placement tool.
Figure 2:
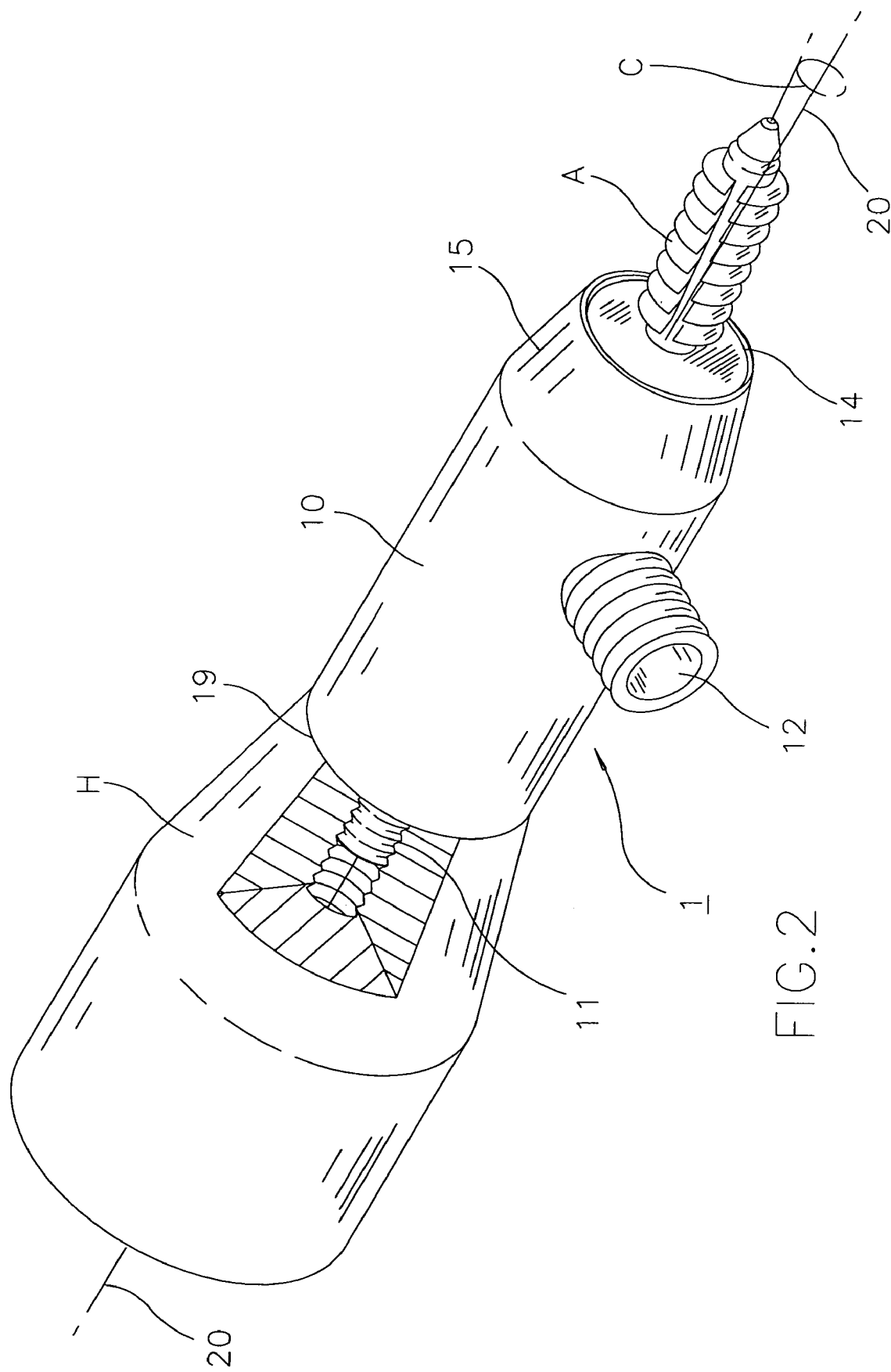
FIG. 2 illustrates a perspective view of the clip placement tool of FIG. 1 with the clip work piece positioned within the tool for insertion.

FIGS. 1–2 illustrate a preferred embodiment of the clip placement tool 1 made in accordance of the present invention. The invention has a main body 10 that may be manufactured from a wide range of flexible or ridged material, an example of these materials include steel, brass, aluminum, delrin, and nylon. The main body has a feature 11 (common to the tooling industry) on the surface 19 to affix the tool 1 to an operator handle H (shown in cross section), or to a mechanical device as an end-effecter. This feature 11 may be a drilled and tapped hole for a machine screw or stud, but just as well could be a shaft and roll-pin or other means. The feature 11 may also be disposed on the main body 10 as well.

The main body 10 further includes a feature 12 that permits the affixing of a vacuum source that will use vacuum in a chamber 13 to securely hold a clip designated A to the lip 14 of the nose feature 15. The vacuum source may be located on the main body 10 or on the surface 19 or through feature 11. The lip 14 is arranged in a circular fashion around (and forward of) the vacuum chamber 13 to fixture the clip A and ensure the clip is centered. The lip 14 also includes two edges 17 and 18 that provide a lip-to-clip seal. The vacuum chamber 13 surrounds the static placement post 16. The clip A will stay affixed to the lip 14 as long as there is sufficient vacuum in the vacuum chamber 13. This means that the clip A will be held in place even if placed off-center as demonstrated in FIGS. 2 and 4. The static placement post 16 and lip 14 provide support on the head of the clip at all times as well as during the insertion process. The main body 10 and clip can maintain the same centerline 20 as the clip is driven into a hole.

The invention may be used as an end-effecter of a dedicated placement mechanism, a pick/place mechanism, a robotic application or in a hand tool as commonly used by a person. It may be used to pick up a clip or a clip may be positioned with the invention by hand or by a mechanism such as a robot or feed system that is common to the industry.

As stated earlier, the plastic Christmas tree style clips are used in a wide array of products and the clips will secure one object to another object through a drilled or cored hole. The clips are very economical to produce and only cost pennies per product. The clips are mass produced in large volumes so part to part tolerance varies significantly as well. As the US manufacturing sector strives to produce products that are economically priced and compete in a world economy, the per-part price in each device is critical. As a result, the manufacturing industry typically uses operators to place these clips by hand in order to keep the price of their product down. Of course the manufacturing industry would like to automate this procedure and only in some cases will the volume of the device permit this. Historically the clips were placed during the final assembly stage of manufacturing but now, more and more pre-assembly, including the placement of clips are done in the early stages of the manufacturing process. In this state of the process the operator cost is typically lower than at the final assembly stage. For instance, these assembly operators are positioned near and as a post-process to the molding process. For example, a device is molded and then the device is presented to the operator via robot or conveyor and placed into a fixture. The operator acquires a fist full of clips, and proceeds to place the point of a clip in a hole and then push it in with their finger or thumb. In some instances several clips are placed lightly in the holes, and the crude hand tool is used to go from clip to clip in order to finish seating each clip. The device is then packed into dunnage for shipment to the end-user. Due to the amount of force required to push a clip into place, the operators over time will likely acquire problems with fingers and joints including carpel tunnel syndrome as well as other related joint and medical problems.

The invention stated herein will help alleviate the operator health problems, as related to clip placement since the invention would be used to provide the force for clip placement. An interesting feature of the invention is that the shape and size of the nose feature 15 acts as a guide for the operator's fingers when they are placing a clip A onto lip 14. Another interesting feature of the invention is that the position of the clips to the invention is not critical. (See FIGS. 2 and 4). That is to say the clip A may be placed off center (in any radial fashion) by angle C as shown in FIGS. 2 and 4, as long as it will stick to the surface of the invention while vacuum is being induced to chamber 13. The lip 14 ensures the vacuum fits the edge of the clip head A2, yet with its offset feature provides two (2) sealing edges 17 and 18. (See FIGS. 1, 3 and 4). The two (2) sealing edges 17 and 18 of lip 14 provides enough forgiveness in part to part tolerance and part variability (including part flash) that it will fixture a wide array of clips that are skewed or placed at an angle C to the centerline 20.

The static placement post 16 of the present invention is unique in the fact that other inventions and placement devices include moving placement pins and mechanical or electrical mechanisms to move the pins. The static placement post 16 provides backup for the clip A during the placement process and additional seating surface for the clip head. Since the ribbed shank of the clip exerts resistance as it is shoved through a device, the static placement post 16 acts as an anvil to backup the clip A but only on the area inline with the force and not the entire surface of the clip head A2.

Figure 3:
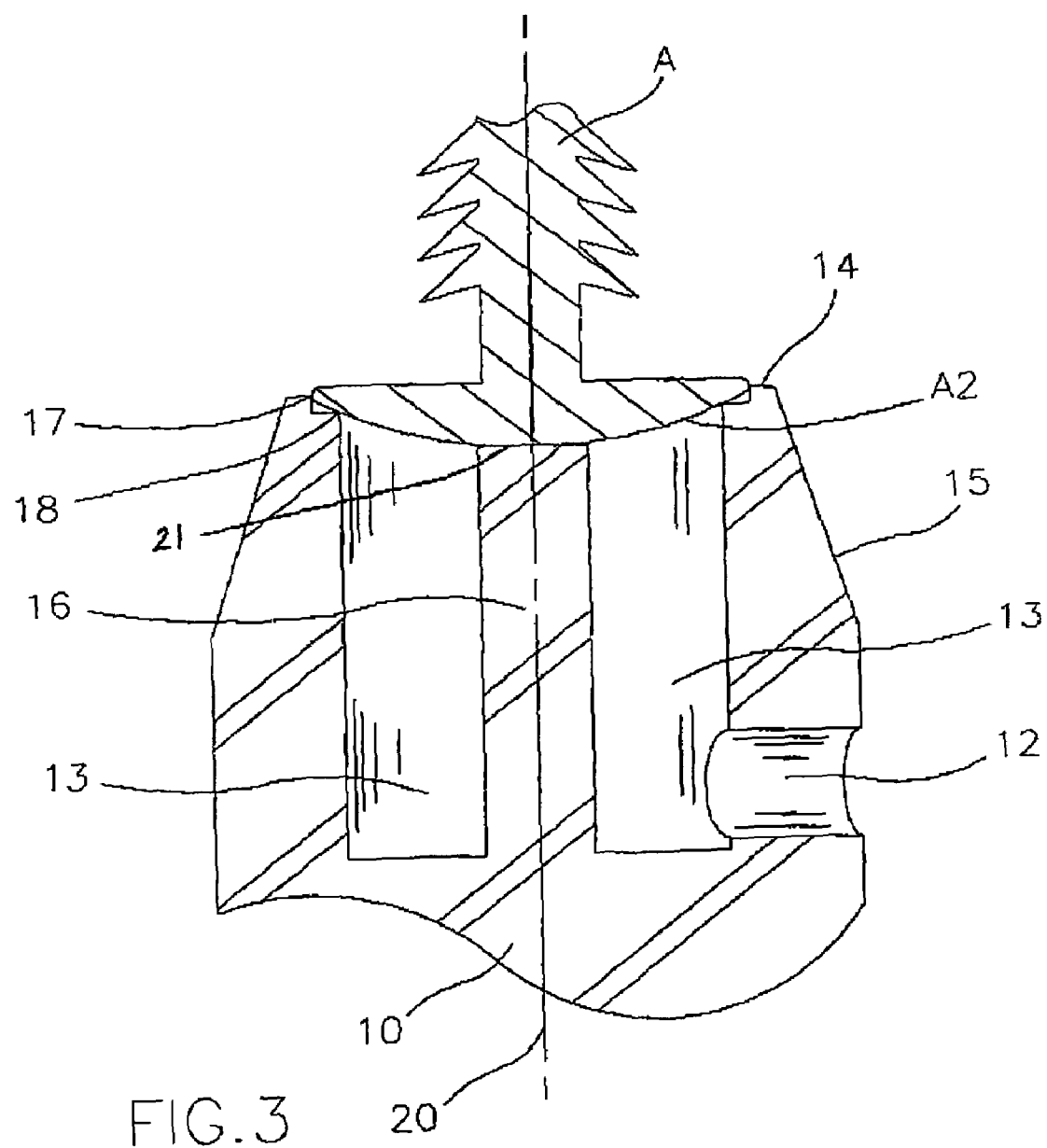
FIG. 3 shows a partial cross section view of the tool in use with a clip work piece.
Figure 4:
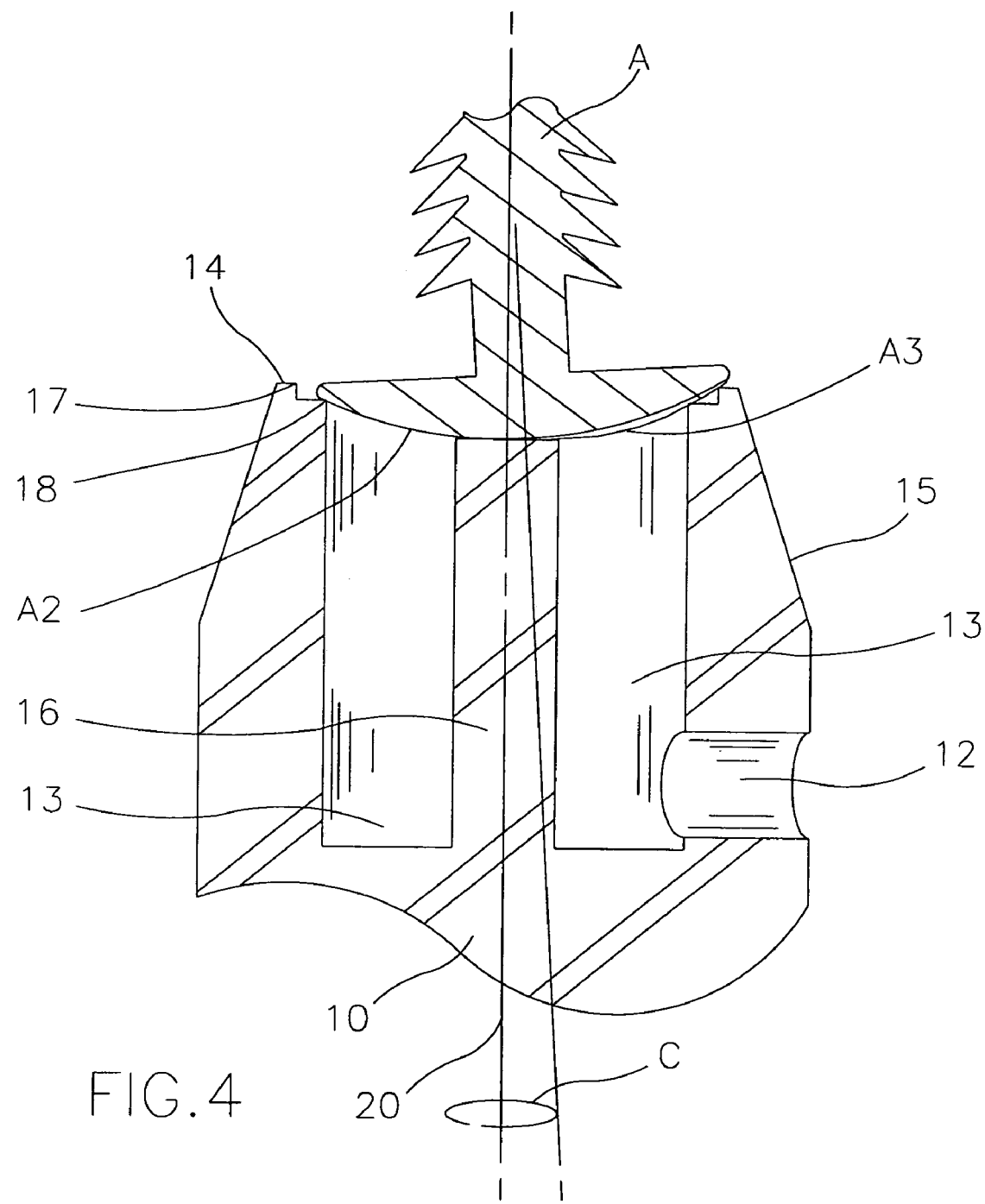
FIG. 4 shows a partial cross section view of the tool in use with clip work piece rotated.

FIG. 3 shows a partial cross-section view of the clip A and tool 1 lip 14. The clip A is held to the inner edge 17 and to the outer edge 18 of the lip 14. Inner and outer edges can be separated by a face surface 21 that matches the surface of clip head A2. The clips A can be fairly standard, irregularities A3 or misplacement of the clip A can still be sealed because of the extent of the edge 18. (See FIG. 4). Irregularities in the clip can include mold defects, flashing, scratches, shrinkage or variations between suppliers.

Figure 5:
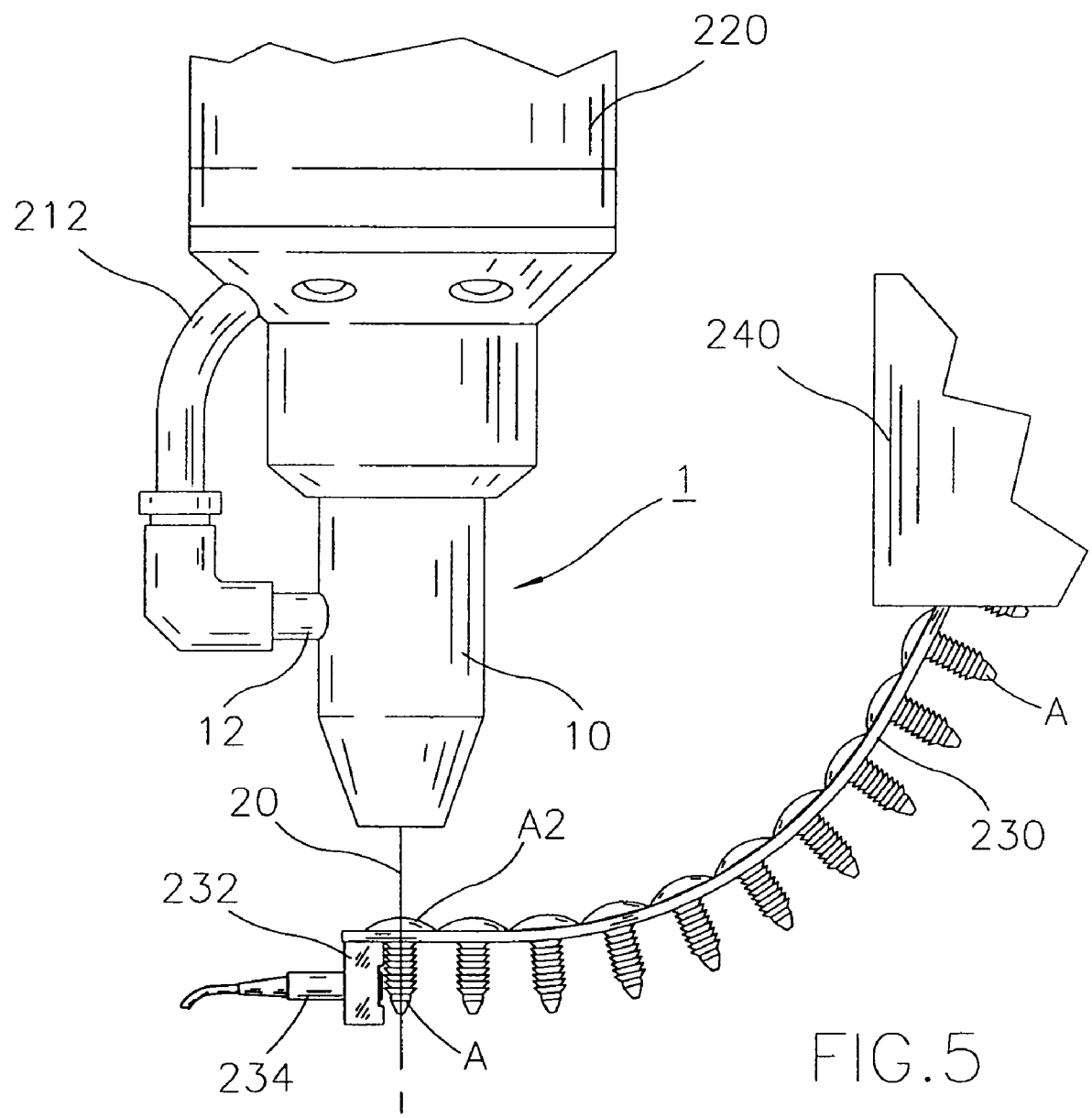
FIG. 5 shows one possible arrangement where the tool is used as an end-effecter.

FIG. 5 shows the tool 1 in use as an end effecter for a robotic device such as a pick and place 220. Vacuum is supplied to the feature 12 through a vacuum line 212. Clips A are supplied from a feeder 240 such as a vibratory feeder to a track 230. Gravity can pull the clips down the track 230 to a stop 232 which can include a sensor 234 to sense that clips A are present on the track 230.

Figure 6:
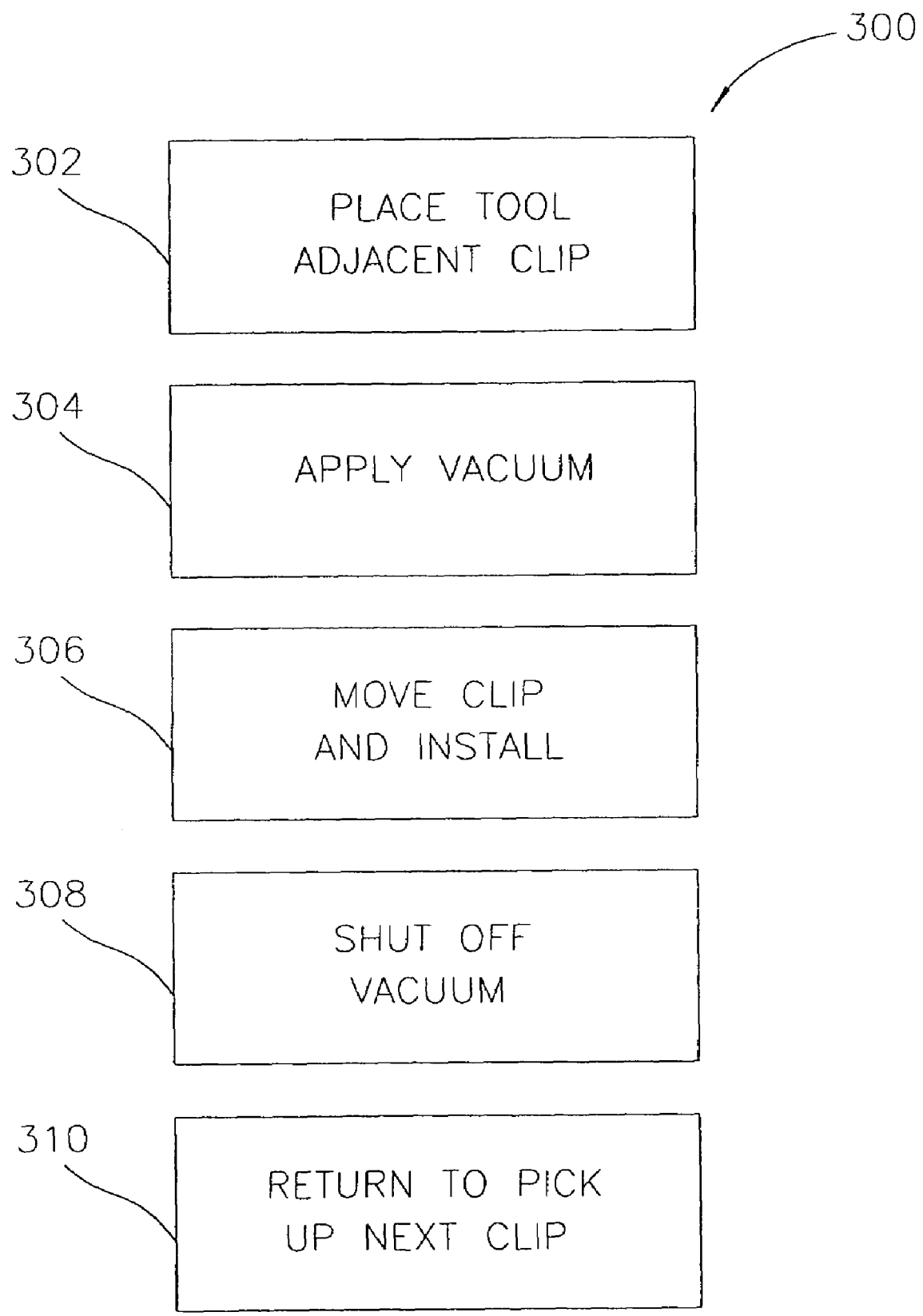
FIG. 6 shows a method of using the tool.

FIG. 6 shows one possible method 300 of operating the device of FIG. 5. In step 302 the tool 1 is placed adjacent to the head A2 of a clip A. Vacuum 304 is applied to the head A2 and then the clip A can be moved 306 to a hole for installation. The main body 10 with motion provided by the pick and place 220 can drive the clip A into the hole in a direction parallel to the centerline 20. Then vacuum can be shut off 308 to the chamber 13 and the main body 10 can be moved back to pick up the next clip A.

Although the description above contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

Thus the scope of the invention should be determined by the appended claims in the formal application and their legal equivalents, rather than by the examples given.

I claim:

1. A clip placement tool to nest and fixture plastic clip work pieces for automatic or manual insertion in a hole, the clip placement tool comprising:
    a main body including a first feature disposed on a surface,
    a second feature for attachment to a vacuum source, said vacuum source produces a vacuum in a chamber within the main body,
    a nose portion opposite the first feature, said nose portion including a lip having first and second edges for receiving the work piece, whereas the lip is forward of the chamber,
    a placement post positioned within the chamber,
    wherein the placement post and lip provide support on a head of the work piece at all times during the insertion of the work piece in said hole.

2. The clip placement tool as recited in claim 1, wherein the main body is constructed of a lightweight material.

3. The clip placement tool as recited in claim 1, wherein the placement post is stationary.

4. A clip placement tool to fixture a clip for insertion in a hole, the clip placement tool comprising:
    a main body including an attachment feature,
    a vacuum source, said vacuum source produces a vacuum in a chamber within the main body, a nose portion opposite the attachment feature, said nose portion including a lip having first and second edges for receiving a clip, whereas the lip is forward of the chamber, a placement post positioned within the chamber, wherein the placement post and lip provides support on the clip at all times during the insertion of the clip in the hole.

5. The clip placement tool as recited in claim 4, where said attachment feature attaches the tool to a pick and place device.

6. The clip placement tool as recited in claim 4, where said first edge is a first circular seal surrounding said post and wherein said second edge is a second circular seal concentric with said first circular seal.

7. The clip placement tool as recited in claim 6, wherein said first and second edges include a face surface matching a surface on a head portion of said clip.

8. The clip placement tool as recited in claim 4, wherein said tool and clip share a common centerline when said clip is mounted on said post and wherein said tool is adapted to drive said clip in a direction along said centerline.

9. The clip placement tool as recited in claim 4, wherein said vacuum is adapted to hold said clip to said lip.

10. The clip placement tool as recited in claim 9, wherein a head portion of said clip forms a seal with said lip first and second edges.

11. A combination clip placement tool and clip for insertion in a hole, the combination comprising:
    said tool having a main body including an attachment feature,
    a vacuum source, said vacuum source produces a vacuum in a chamber within the main body,
    a nose portion opposite the attachment feature, said nose portion including a lip having first and second edges for receiving a head portion of a clip, whereas the lip is forward of the chamber,
    a placement post positioned within the chamber, wherein the placement post and lip engage the clip during insertion of the clip in the hole and wherein said tool maintains a vacuum on said head portion of said clip at least prior to insertion in said hole.

12. The combination as recited in claim 11, wherein said attachment feature is a machine screw.

13. The combination as recited in claim 11, wherein said lip is a circular seal wherein said first edge is an inner circular edge and wherein said second seal is an outer circular edge and wherein said up includes a face surface that matches a surface on said head portion of said clip.

14. The combination as recited in claim 11, wherein said lip is a circular seal surrounding a portion of said chamber and wherein attachment of said head of said clip to said lip seals the chamber.

15. The combination as recited in claim 14, wherein said placement post is surrounded by said chamber and engages said head of said clip when said head of said clip is attached to said lip.

16. The combination as recited in claim 15, wherein said placement post is at a center of said circular seal.

* * * * *